US012146510B2

(12) United States Patent
Weigand et al.

(10) Patent No.: US 12,146,510 B2
(45) Date of Patent: Nov. 19, 2024

(54) HYDROSTATIC CYLINDER WITH GAS PRESSURE ACCUMULATOR

(71) Applicant: Robert Bosch GmbH, Stuttgart (DE)

(72) Inventors: Marc Weigand, Hafenlohr (DE); Markus Junker, Mainhausen (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 17/770,213

(22) PCT Filed: Oct. 20, 2020

(86) PCT No.: PCT/EP2020/079475
§ 371 (c)(1),
(2) Date: Apr. 19, 2022

(87) PCT Pub. No.: WO2021/078727
PCT Pub. Date: Apr. 29, 2021

(65) Prior Publication Data

US 2022/0397127 A1 Dec. 15, 2022

(30) Foreign Application Priority Data

Oct. 25, 2019 (DE) ..................... 10 2019 216 453.6

(51) Int. Cl.
*F15B 1/24* (2006.01)
*F15B 13/02* (2006.01)
*F15B 15/14* (2006.01)

(52) U.S. Cl.
CPC .............. *F15B 1/24* (2013.01); *F15B 13/027* (2013.01); *F15B 15/1428* (2013.01);
(Continued)

(58) Field of Classification Search
CPC .. F15B 1/24; F15B 2201/205; F15B 2201/31; F15B 2201/4155
See application file for complete search history.

(56) References Cited

U.S. PATENT DOCUMENTS 3,331,117 A * 7/1967 Jacobellis ................. F15B 1/24 29/445
3,669,151 A * 6/1972 Fleming .................. F15B 1/027 417/543
(Continued)

FOREIGN PATENT DOCUMENTS

DE 38 16 102 C1 7/1989
DE 100 11 002 A1 9/2001
(Continued)

OTHER PUBLICATIONS

International Search Report corresponding to International Patent Application No. PCT/EP2020/079475, mailed Jan. 20, 2021 (6 pages).

*Primary Examiner* — Thomas E Lazo
(74) *Attorney, Agent, or Firm* — Maginot, Moore & Beck LLP

(57) ABSTRACT

A hydrostatic cylinder with a gas pressure accumulator, which is preferably designed as a piston accumulator, and which is arranged concentrically on the outer circumference of the cylinder is disclosed. A gas pressure is produced via a constant pressure source and is limited or is essentially constant in the gas pressure accumulator and also a constant pressure medium pressure is independent of the degree of filling of the gas pressure accumulator.

7 Claims, 1 Drawing Sheet

(52) U.S. Cl.
CPC ..... *F15B 2201/205* (2013.01); *F15B 2201/31* (2013.01); *F15B 2201/4155* (2013.01)

(56) References Cited

U.S. PATENT DOCUMENTS

| | | | | |
|---|---|---|---|---|
| 3,677,005 | A * | 7/1972 | Estlick | F15B 11/0725 92/6 R |
| 2006/0207246 | A1* | 9/2006 | Hindman | A01D 34/246 60/413 |
| 2017/0002842 | A1* | 1/2017 | Maurer | F15B 1/265 |
| 2017/0022842 | A1 | 1/2017 | Maurer | |
| 2017/0184133 | A1* | 6/2017 | Boucaux | F15B 1/24 |

FOREIGN PATENT DOCUMENTS

| | | | |
|---|---|---|---|
| DE | 698 05 252 | T2 | 11/2002 |
| DE | 10 2018 201 456 | A1 | 8/2019 |
| EP | 0 447 791 | A2 | 9/1991 |
| EP | 1 703 142 | A1 | 9/2006 |
| WO | 2013/154566 | A1 | 10/2013 |
| WO | 2015/022054 | A1 | 2/2015 |

* cited by examiner

HYDROSTATIC CYLINDER WITH GAS PRESSURE ACCUMULATOR

This application is a 35 U.S.C. § 371 National Stage Application of PCT/EP2020/079475, filed on Oct. 20, 2020, which claims the benefit of priority to Serial No. DE 10 2019 216 453.6, filed on Oct. 25, 2019 in Germany, the disclosures of which are incorporated herein by reference in their entirety.

BACKGROUND

The disclosure relates to a cylinder having a gas pressure accumulator.

Hydraulic or hydrostatic cylinders on the outer circumference of which gas pressure accumulators are arranged are known from the prior art.

In the documents DE 100 11 002 A1, DE 38 16 102 C1, DE 10 2018 201 456 A1 and DE 698 05 252 T2, such cylinders having gas pressure accumulators which are hollow-cylindrical or which have an annular cross section are disclosed. The gas pressure accumulators have hose-like membranes which separate an annular gas chamber from an annular pressurized medium chamber. In the documents DE 10 2018 201 456 A1 and DE 698 05 252 T2, there is in each case further disclosed a filling valve via which gas can flow into the annular gas chamber arranged externally.

The disadvantage of such cylinders with integrated gas pressure accumulators is that the gas pressure accumulators as a result of the enclosed gas are not suitable for small permissible pressure ranges.

SUMMARY

In contrast, an object of the disclosure is to provide a cylinder with an integrated gas pressure accumulator which, in spite of its compact configuration, is suitable for small permissible pressure ranges which are, for example, permissible in the tank region.

In particular, a substantially constant pressure is intended to be provided in the gas pressure accumulator.

This object is achieved with a cylinder having a gas pressure accumulator having the features of patent claim 1.

Other advantageous embodiments of the disclosure are described hereinafter.

The claimed arrangement has a cylinder having an integrated gas pressure accumulator, wherein the gas pressure accumulator when viewed in cross section is arranged in an annular manner at the outer circumference of the cylinder. In the gas pressure accumulator, a gas chamber is separated from a pressure medium chamber by means of a resilient or movable separation element. According to the disclosure, the gas chamber can be connected or is connected to a constant pressure source. Consequently, the objective mentioned above is achieved since the gas pressure accumulator in the pressure medium chamber thereof also has a pressure which is constant or constant within limits when pressure medium is discharged from the pressure medium chamber, wherein the volume of the gas chamber increases. The constant pressure source then conveys additional gas into the gas chamber.

Furthermore, the dynamic of the gas pressure accumulator is improved. Furthermore, there is produced no loss of the active medium or gas, for example, nitrogen. Finally, the configuration of the gas pressure accumulator is simplified since a gas compression calculation is omitted.

In a preferred application, the gas pressure accumulator is a low-pressure accumulator, wherein the pressure medium chamber has a low-pressure connection. There can be connected to the low-pressure connection a hydraulic component of a closed hydraulic system which is also associated with the cylinder and to which the cylinder is also connected by means of one or two operating connections. The hydraulic system is, for example, a servo hydraulic axle.

The low-pressure accumulator and the constant pressure source may, for example, be configured for a maximum pressure of 7 bar, with a use for very small permissible pressure margins or pressure ranges, for example, from 1 to 3 bar.

In a particularly preferred embodiment, the separation element is an annular piston. Consequently, there is provided a combination of a cylinder and integrated gas accumulator which in contrast to the prior art is configured as a piston accumulator.

Particularly with the embodiment of the gas pressure accumulator as a piston accumulator, there is preferred an intermediate pipe which is finely processed at both sides and which forms at one side an outer wall of the cylinder and at the other side an inner wall of the gas pressure accumulator.

In order, in the event of failure of the constant pressure source or in the event of a line breakage, to be able to maintain at least a degree of gas pressure, it is preferable for there to be arranged between the constant pressure source and an inlet a non-return valve which closes from the inlet to the constant pressure source.

In a particularly preferred development, the gas chamber has an outlet on which there is arranged a non-return valve which is pretensioned by means of a spring and which closes in the direction toward the outlet. Consequently, the gas pressure chamber also has in the pressure medium chamber thereof a pressure which is constant or constant within limits when pressure medium is conveyed into the pressure medium chamber, wherein the volume of the gas chamber decreases. Gas then escapes from the gas chamber via the outlet. In order in this instance to be able to adjust the gas pressure of the gas pressure accumulator, it is preferable for a force of the spring to be able to be adjusted.

The number of required components of the arrangement can be reduced when the gas pressure accumulator is received between two cylinder flanges which are secured at the end to the cylinder. These two cylinder flanges can cover and close the cylinder and the gas pressure accumulator at both sides.

The low-pressure connection may be arranged or formed on one of the two cylinder flanges. In the development with the annular piston, therefore, the pressure medium chamber in which the annular piston moves into abutment with the relevant cylinder flange can thus be completely emptied.

The inlet and/or the outlet may be arranged or formed on an outer pipe of the gas pressure accumulator. The inlet and/or the outlet may be arranged or formed on one of the two cylinder flanges.

When the cylinder is a differential cylinder or a synchronizing cylinder, it has two operating connections. In the development with the two cylinder flanges, the two operating connections are in a particularly preferred manner each arranged or formed on one of the cylinder flanges.

BRIEF DESCRIPTION OF THE DRAWINGS

With reference to the Figures, two embodiments of the disclosure will be described in detail. In the drawings.

DETAILED DESCRIPTION

Figure 1:
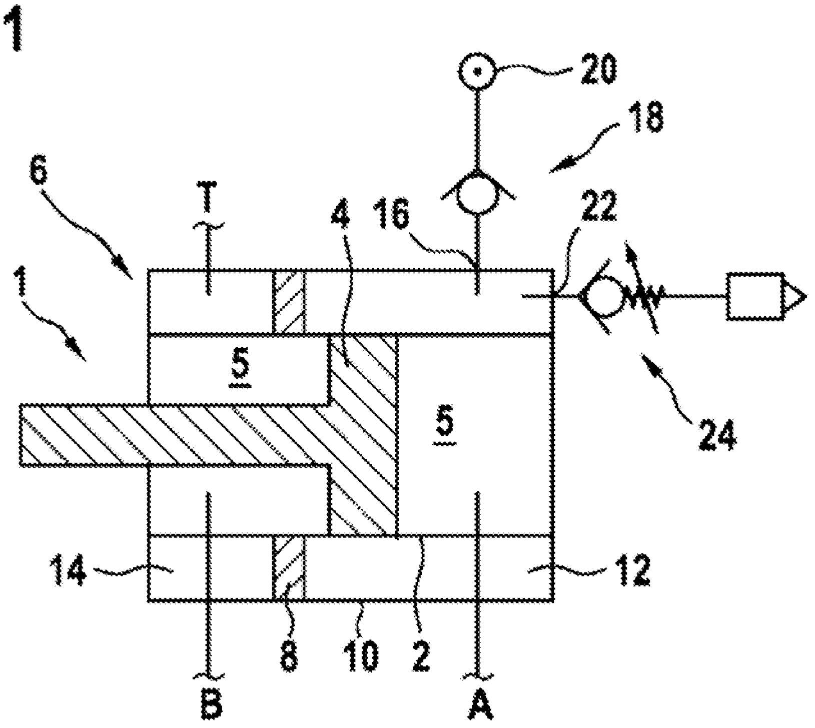
FIG. 1 is a schematic longitudinal section of the cylinder according to the disclosure with a gas pressure accumulator according to a first embodiment.

FIG. 1 shows a cylinder 2 which is constructed as a differential cylinder. The cylinder 1 is formed by means of an intermediate pipe 2 on the inner circumference of which a piston 4 is displaceably guided. The piston 4 separates two working chambers 5 of the cylinder 1 from each other.

On the outer circumference of the intermediate pipe 2, a gas pressure accumulator 6 which is in the form of a piston accumulator is arranged concentrically with respect to the cylinder 1. It has an annular piston 8 which is displaceably guided between an outer circumference of the intermediate pipe 2 and an inner circumference of an outer pipe 10. Since the piston 4 is guided in a sealing and displaceable manner along the inner circumference of the intermediate pipe 2 and since the annular piston 8 is guided in a sealing and displaceable manner, on the one hand, along the outer circumference of the intermediate pipe 2 and, on the other hand, along the inner circumference of the outer pipe 10, the three mentioned circumferential faces are finely processed.

The annular piston 8 of the gas pressure accumulator 6 separates a gas chamber 12 from a pressure medium chamber 14. So that the gas pressure accumulator 6 always has or applies a pressure which is constant or constant within limits independently of the filling level in the pressure medium chamber 14 thereof, a constant pressure source 20 is connected to an inlet 16 of the gas chamber 12 via a non-return valve 18. The non-return valve 18 opens from the constant pressure source 20 to the inlet 16. When pressure medium from the pressure medium chamber 14 is discharged into the connected closed system (not illustrated) and the annular piston 8 moves (in FIG. 1 to the left) so that the volume of the gas chamber 12 increases, the constant pressure source 20 conveys additional gas into the gas chamber 12.

Also in order to achieve pressure relationships which are constant or constant within limits, there is connected to an outlet 22 of the gas chamber 12 a non-return valve 24 which is pretensioned by means of a spring and whose opening direction is directed from the outlet 22 to the environment. As a result of the spring, a degree of equivalent limit pressure (for example, 3 bar) in the gas chamber 12 must be exceeded before the non-return valve 24 opens and gas can flow away. This limit pressure can be adjusted by means of an adjustment apparatus of the spring and can also be adjusted later. If additional pressure medium is conveyed into the pressure medium chamber 14 and the annular piston 8 is moved (in FIG. 8 to the right) so that the volume of the gas chamber 12 decreases, therefore, gas can flow away via the outlet 22.

Figure 2:
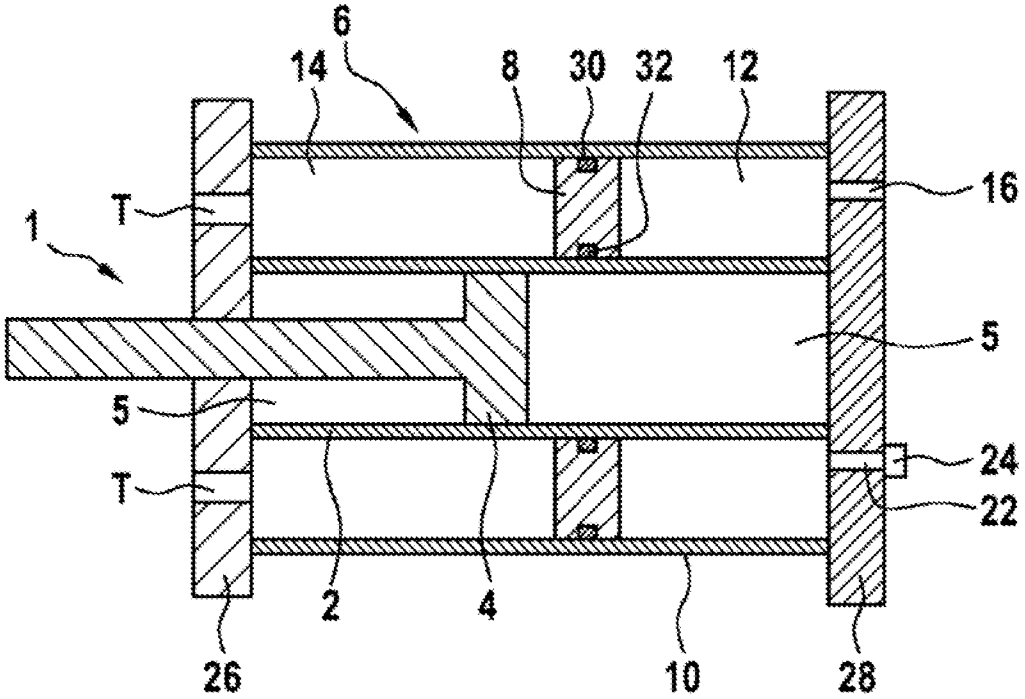
FIG. 2 is a longitudinal section of the cylinder according to the disclosure with a gas pressure accumulator according to a second embodiment.

FIG. 2 shows a second embodiment of the combination according to the disclosure comprising the cylinder 1 and gas pressure accumulator 6 as a longitudinal section.

The following components and functions correspond to those of the first embodiment of FIG. 1: the cylinder 1 is a differential cylinder and is formed by means of the intermediate pipe 2 on the inner circumference of which the piston 4 is displaceably guided. The piston 4 separates the two working chambers 5 of the cylinder 1 from each other. On the outer circumference of the intermediate pipe 2, the gas pressure accumulator 6 which is constructed as a piston accumulator is arranged concentrically with respect to the cylinder 1. It has the annular piston 8 which is displaceably guided between an outer circumference of the intermediate pipe 2 and the inner circumference of the outer pipe 10. Since the piston 4 is guided along the inner circumference of the intermediate pipe 2 in a sealing and displaceable manner and since the annular piston 8 is further guided in a sealing and displaceable manner along, on the one hand, the outer circumference of the intermediate pipe 2 and, on the other hand, the inner circumference of the outer pipe 10, the three mentioned circumferential faces are finely processed. The annular piston 8 of the gas pressure accumulator 6 separates the gas chamber 12 from the pressure medium chamber 14. So that the gas pressure accumulator 6 always applies or has a pressure which is constant or constant within limits regardless of the filling level in the pressure medium chamber 14 thereof, a constant pressure source is connected to the inlet 16 of the gas chamber 12 via the non-return valve (both not illustrated in FIG. 2). The non-return valve opens from the constant pressure source to the inlet 16. When pressure medium from the pressure medium chamber 14 is discharged into the connected closed system and the annular piston 8 moves (in FIG. 2 to the left) so that the volume of the gas chamber 12 increases, the constant pressure source conveys additional gas into the gas chamber 12. Also in order to achieve pressure relationships which are constant or constant within limits, there is connected to the outlet 22 of the gas chamber 12 the non-return valve 24 which is pretensioned by means of the spring and whose opening direction is directed from the outlet 22 to the environment. As a result of the spring (not shown in FIG. 2), a degree of equivalent limit pressure in the gas chamber 12 must be exceeded before the non-return valve 24 opens and gas can flow away. This limit pressure can be adjusted by means of an adjustment apparatus (not shown in FIG. 2) of the spring and also be adjusted subsequently. If additional pressure medium is thus conveyed into the pressure medium chamber 14 and the annular piston 8 is moved (in FIG. 2 to the right) so that the volume of the gas chamber 12 decreases, gas can flow away via the outlet 22.

Additionally or alternatively to the first embodiment from FIG. 1, in the second embodiment according to FIG. 2 the following components and functions are provided:

A pressure-chamber-side cylinder flange 26 and a gas-chamber-side cylinder flange 28 can be seen and in each case internally close the corresponding end face of the cylinder 1 and in each case externally close the corresponding end face of the gas pressure accumulator 6. To this end, the intermediate pipe 2 and the outer pipe 10 are configured to be approximately of the same length. Consequently, the number of components with respect to the prior art is decreased.

The outlet 22 with the non-return valve 24 and the inlet are constructed or arranged at the gas-chamber-side cylinder flange 28. Two tank connections T are formed on the pressure-chamber-side cylinder flange 26.

Finally, a seal 30 on the outer circumference of the annular piston 8 and a seal 32 on the inner circumference of the annular piston 8 are illustrated.

Since the cylinder 1 is a differential cylinder, it has two working connections A, B (not shown). They are in each case arranged or formed on one of the cylinder flanges 26, 28.

There is disclosed a hydrostatic cylinder having a gas pressure accumulator which is preferably constructed as a piston accumulator and which is arranged concentrically on the outer circumference of the cylinder. Via a constant pressure source, a gas pressure which is constant within limits or substantially constant is produced in the gas pressure accumulator and consequently also a constant pressure medium pressure regardless of the filling level of the gas pressure accumulator.

The invention claimed is:

1. A cylinder assembly, comprising:

a hydrostatic cylinder defining an outer circumference;

an annular gas pressure accumulator arranged on the outer circumference of the hydrostatic cylinder; and a first cylinder flange and a second cylinder flange that are spaced apart from each other, wherein the annular gas pressure accumulator defines a gas chamber and a pressure medium chamber, wherein the annular gas pressure accumulator includes a resilient or movable separation element that is configured and arranged to separate the gas chamber from the pressure medium chamber, wherein the gas chamber is configured to be connected to a constant pressure source, wherein the annular gas pressure accumulator is positioned between the first cylinder flange and the second cylinder flange, wherein the annular gas pressure accumulator is a low-pressure accumulator, wherein the pressure medium chamber has a low-pressure connection, wherein the low-pressure connection is arranged or formed on the first cylinder flange, wherein the annular gas pressure chamber includes an inlet and a non-return inlet valve, wherein the inlet is configured to be connected to the constant pressure source, wherein the non-return inlet valve is arranged between the constant pressure source and the inlet, wherein the inlet is arranged or formed on the second cylinder flange, wherein the annular gas pressure chamber further includes (i) an outlet, and (ii) a non-return outlet valve connected to the outlet, wherein the non-return outlet valve is pretensioned by a spring, and wherein the outlet is also arranged or formed on the second cylinder flange.

2. The cylinder assembly as claimed in claim 1, wherein:

the annular gas pressure accumulator is a low-pressure accumulator, and the pressure medium chamber has a low-pressure connection.

3. The cylinder assembly as claimed in claim 1, wherein the resilient or movable separation element is an annular piston.

4. The cylinder assembly as claimed in claim 1, wherein:

the cylinder assembly has an intermediate pipe which is finely processed at both sides and which forms an outer wall of the hydrostatic cylinder and an inner wall of the annular gas pressure accumulator.

5. The cylinder assembly as claimed in claim 1, wherein:

the annular gas pressure chamber includes an inlet and a non-return inlet valve, the inlet is configured to be connected to the constant pressure source, and the non-return inlet valve is arranged between the constant pressure source and the inlet.

6. The cylinder assembly as claimed in claim 1, wherein:

the annular gas pressure chamber further includes (i) an outlet, and (ii) a non-return outlet valve connected to the outlet, and the non-return outlet valve is pretensioned by a spring.

7. The cylinder assembly as claimed in claim 6, wherein a force of the spring is configured to be adjustable.

* * * * *